United States Patent

Takata

[15] 3,702,638
[45] Nov. 14, 1972

[54] EARTH WORKING ROTOR WITH IMPROVED TINES

[72] Inventor: Harry H. Takata, Golden Valley, Minn.

[73] Assignee: Raygo, Inc., Minneapolis, Minn.

[22] Filed: Jan. 18, 1971

[21] Appl. No.: 107,039

[52] U.S. Cl. ................... 172/540, 172/556, 299/91
[51] Int. Cl. .............................................. A01b 33/10
[58] Field of Search............ 172/42, 48, 60, 118–123, 172/96, 532, 540, 556, 770, 765; 299/91; 287/95

[56] References Cited

UNITED STATES PATENTS

| | | | |
|---|---|---|---|
| 2,663,241 | 12/1953 | Howard | 172/556 |
| 2,835,182 | 5/1958 | Smithburn | 172/556 |
| 3,589,452 | 6/1971 | Haker et al. | 172/119 |
| 1,415,663 | 5/1922 | Lilleberg | 172/532 |
| 2,802,408 | 8/1957 | Seaman | 172/556 |

*Primary Examiner*—Robert E. Pulfrey
*Assistant Examiner*—C. W. Hanor
*Attorney*—Ira Milton Jones

[57] ABSTRACT

Tines of an earth working rotor, detachably fixed to axially spaced disc-like tine carriers, are L-shaped, with flat shank and hoe portions. A sharp leading edge on the hoe is provided by a bevel on its surface remote from the shank, and on the shank by a bevel on its surface facing the hoe. A clamping plate, secured by bolts threaded into the carrier, clamps the shank flatwise thereagainst. Work reaction force is taken by a pair of abutments on the carrier, one engaging the leading edge of the shank and the other, axially farther out, engaging its trailing edge.

7 Claims, 7 Drawing Figures

INVENTOR
Harry H. Takata
BY
ATTORNEY

EARTH WORKING ROTOR WITH IMPROVED TINES

This invention relates to rotors for ground working machines such as soil stabilizers and rotary tillers, and the invention is more particularly concerned with improvements in the tines for such rotors and their connections to the rotor body.

The general type of rotor and tine with which this invention is concerned is exemplified by the Lilleberg U.S. Pat. No. 1,415,663, and the Riddle U.S. Pat. No. 3,362,482.

In general, such a rotor is the work performing part of a machine that comprises an engine or motor by which the rotor is power driven for rotation in one direction on a horizontal axis, means including traction wheels for advancing the machine across ground to be worked, with the rotor axis generally transverse to the direction of such motion, and means for guiding the direction of such advance. The rotor has a plurality of ground cutting tines that extend more or less radially from it at axially spaced intervals, the tines being staggered or otherwise arranged in such angular and axial relationship to one another that they engage the ground sequentially and the cutting action is substantially uniform along the entire length of the rotor as the machine advances across the ground at a steady speed.

In rotors of the type here under consideration, each tine has a shank that is elongated in a direction more or less radial to the rotor axis. In the present case each tine is L-shaped, having a longer arm that comprises a shank portion by which the tine is secured to the rotor and a shorter arm projecting at right angles to the shank, lengthwise parallel to the rotor axis, that performs a cutting and lifting function and can be regarded as a hoe portion. In form the tine is a flat bar bent to L-shape, with its opposite flat surfaces extending parallel to its direction of orbital motion so that it has leading and trailing edge portions. To provide good cutting action and minimize the power required to drive the rotor, the leading edge of the hoe portion is made fairly sharp, and the leading edge of the shank is likewise sharpened for some distance inwardly from the hoe portion.

Since the tines are subjected to considerable wear during use, it is necessary that they be attached to the rotor body in a manner that permits of their quick and easy replacement, yet holds them very firmly and securely when they are in use. Of course any replacement of the tines, however expeditiously it may be performed, requires that the machine be idle while the replacement is taking place, and hence it is very important that the tines have a long useful life so that replacement is needed only infrequently.

With these considerations in mind, it is a general object of the present invention to provide an earth working machine rotor of the character described that affords a minimum of down time for the machine on which it is installed, both by reason for the long useful life of its tines and the facility with which tines can be replaced when they become seriously worn.

More specifically, it is an object of this invention to provide a tine for a ground working rotor of the character described that is formed to afford very efficient cutting action as it moves through the ground, in that all of its surfaces that engage uncut soil tend to be oriented substantially parallel to their directions of motion and thus impose upon the tine the least amount of reaction force to wear it away and to consume power in driving it.

A further specific object of this invention is to provide a tine for an earth working rotor that wears down very slowly and does not materially change its depth of cut as it wears.

It is also an object of this invention to provide a tine of the character described that is so formed that substantially all of the reaction forces that are imposed upon it as it cuts, are oriented edgewise, that is, in the direction of its greatest strength, the reaction forces upon it in its flatwise direction being small enough to be easily withstood. It will be appreciated that the attainment of this objective increases the useful life of the tine and decreases the power required for driving the tined rotor.

Another object of this invention is to provide a tined rotor for an earth working machine which is so constructed and arranged that each tine can be readily withdrawn from the rotor body upon the mere loosening of two bolts, and can be secured by tightening of the same two bolts, installation and removal of a tine when the bolts are loose being merely a matter of edgewise and lengthwise movement thereof.

It is also an object of this invention to provide an earth working machine rotor having removable tines, which rotor is so constructed and arranged that any tine can be replaced without the necessity for removing from the rotor body any part other than the tine itself, so that the rotor of this invention permits tine replacements to be made at a work site without danger that small parts will be dropped and lost.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Figure 1:
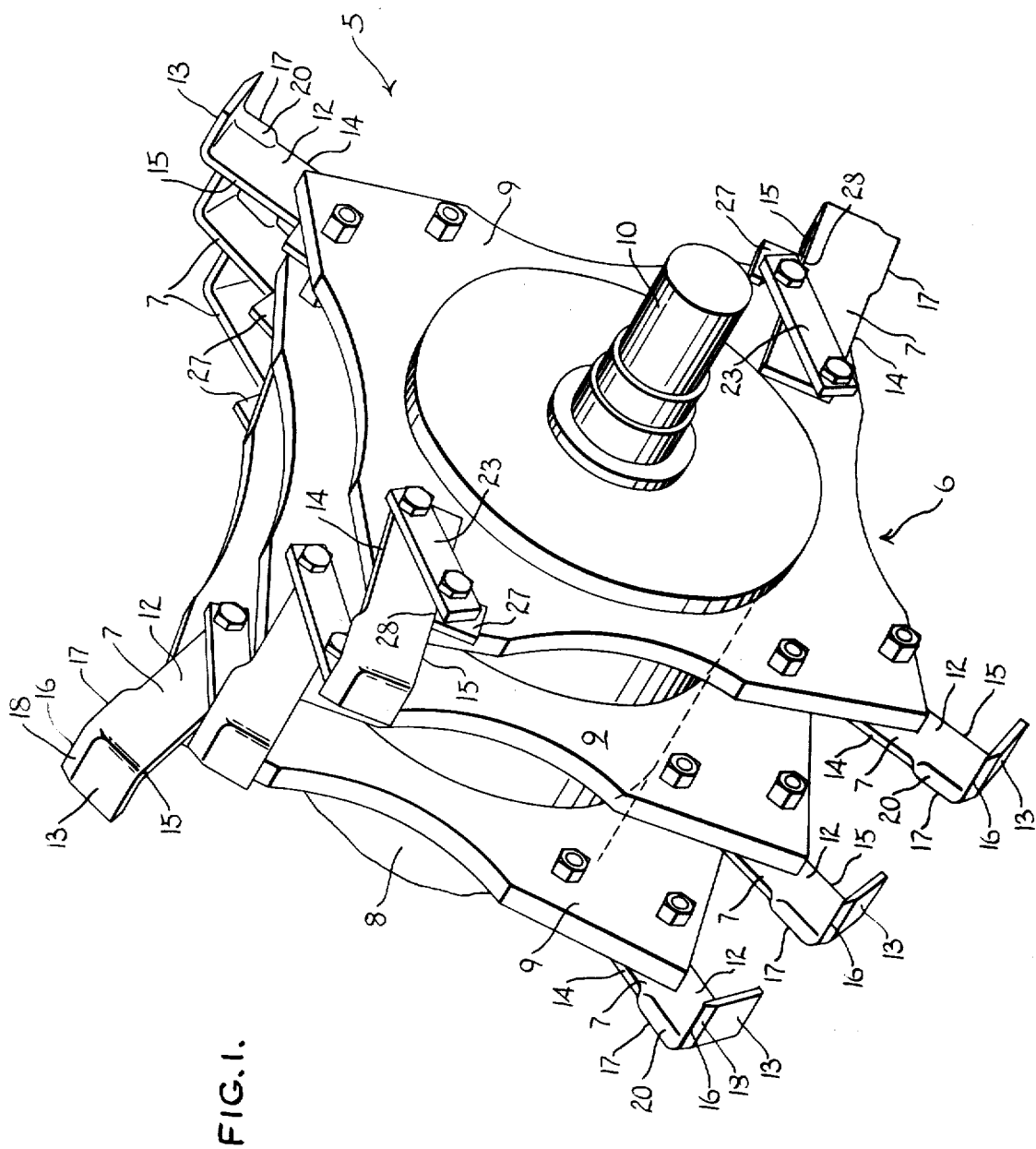
FIG. 1 is a perspective view of one end portion of an earth working rotor embodying the principles of this invention.
Figure 2:
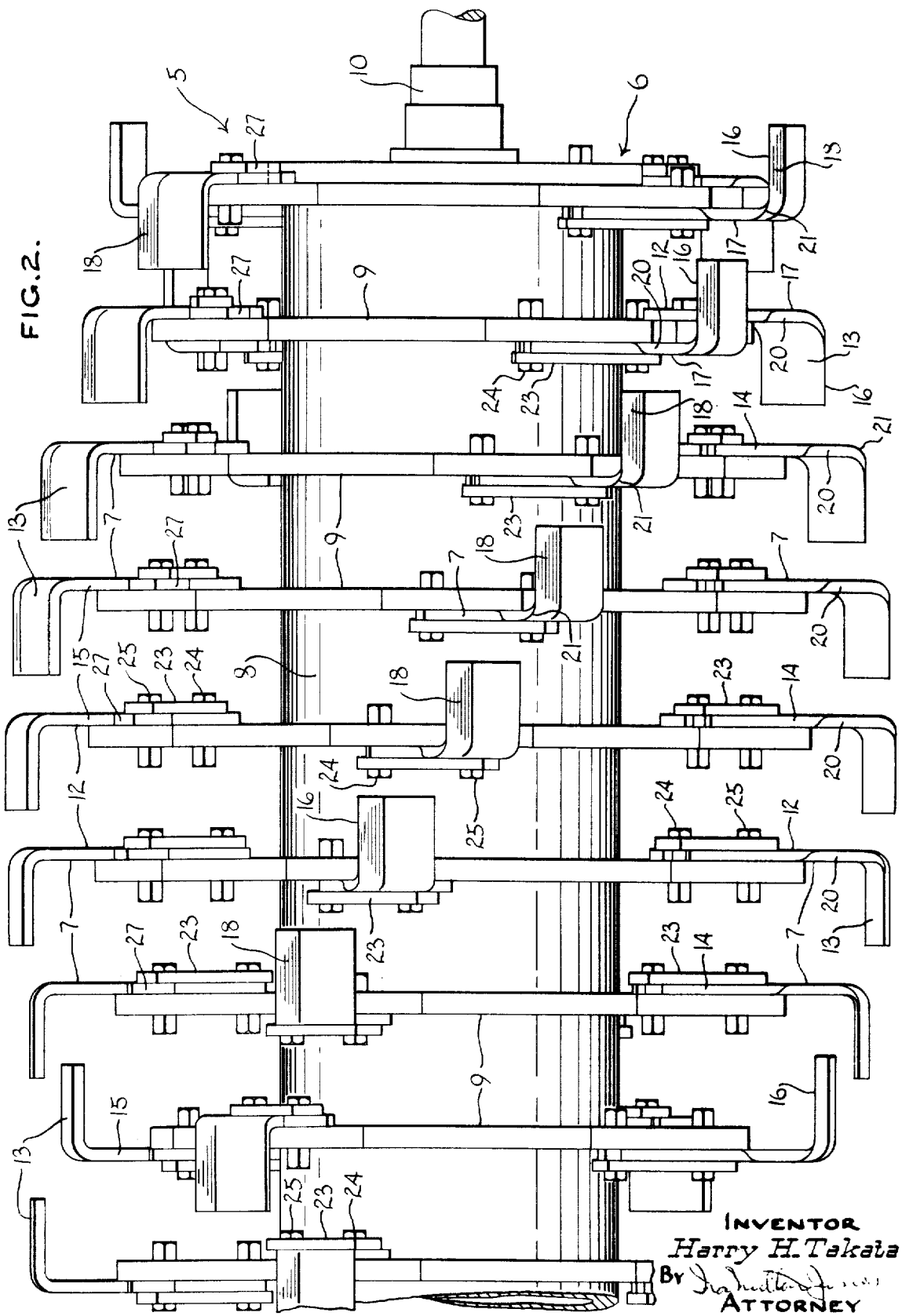
FIG. 2 is a front view of the rotor shown in FIG. 1, but with somewhat less than half its length not shown.

Referring now to the accompanying drawings, the numeral 5 designates generally an earth working rotor embodying the principles of this invention, adapted to be mounted on a machine (not shown) that provides for guided forward movement of the rotor across soil to be worked and for power driven rotation of the rotor about a horizontal axis that is transverse to the normal direction of travel. While the rotor improvements of the present invention are useful with a rotor that turns in either direction relative to the direction of its normal travel, it has been found very advantageous to rotate the rotor in the direction in which the rotor tends to impart rearward motion to the machine that carries it, the counter-propulsion force exerted by the rotor being overcome by tractive power applied to the driving wheels of the machine. For purposes of illustration, therefore, the following description assumes the counter-travel direction of rotor rotation.

The rotor 5 comprises, in general, a rotor body 6 and a plurality of tines 7 that project more or less radially from the rotor body, each tine being so secured to the rotor body (as explained hereinafter) that it is firmly and rigidly anchored thereto but is nevertheless very quickly and easily replaceable.

In general, the rotor body comprises a tube 8 with a plurality of flat disc-like or plate-like carriers 9 welded thereto at uniform intervals along the rotor axis. Shafts 10 coaxially secured to and projecting from the ends of the tube 8 provide for rotatably mounting the rotor in a frame (not shown) which forms part of the machine and by which the rotor may be raised and lowered; and sprockets (also not shown) fixed to the outer ends of the shafts 10 comprise part of a drive system by which rotation is imparted to the rotor.

Each tine carrier 9 has at least one tine 7 — and preferably a plurality of them — mounted thereon. In the embodiment of the invention illustrated, the tine carriers are generally square in planform, and each carries four tines, one extending from each of its corners. Successive tine carriers along the length of the rotor are in angularly displaced relationship to one another, preferably by uniform angular increments, so that along the length of the rotor the tines successively engage the ground being worked in a regular sequence that affords a smooth, even cutting action along the entire length of the rotor.

Each tine 7 is in the form of a flat bar bent into an L-shaped to provide a longer arm 12 that comprises the shank of the tine and a shorter arm 13 that comprises its hoe portion. The hoe portion projects in one direction from the shank, and is generally parallel to the rotor axis. The broad, flat side surfaces of the shank and hoe portions are oriented generally parallel to their direction of orbital motion, and therefore the tine has leading and trailing edges, respectively designated 14 and 15. To facilitate the cutting action of each tine, the leading edge of its hoe portion is sharpened all along its length, as at 16, and the leading edge of that portion of the shank adjacent to the hoe portion is likewise sharpened, as at 17. The sharp leading edge 17 on the shank extends a distance along it from its junction with the hoe portion.

Figure 3:
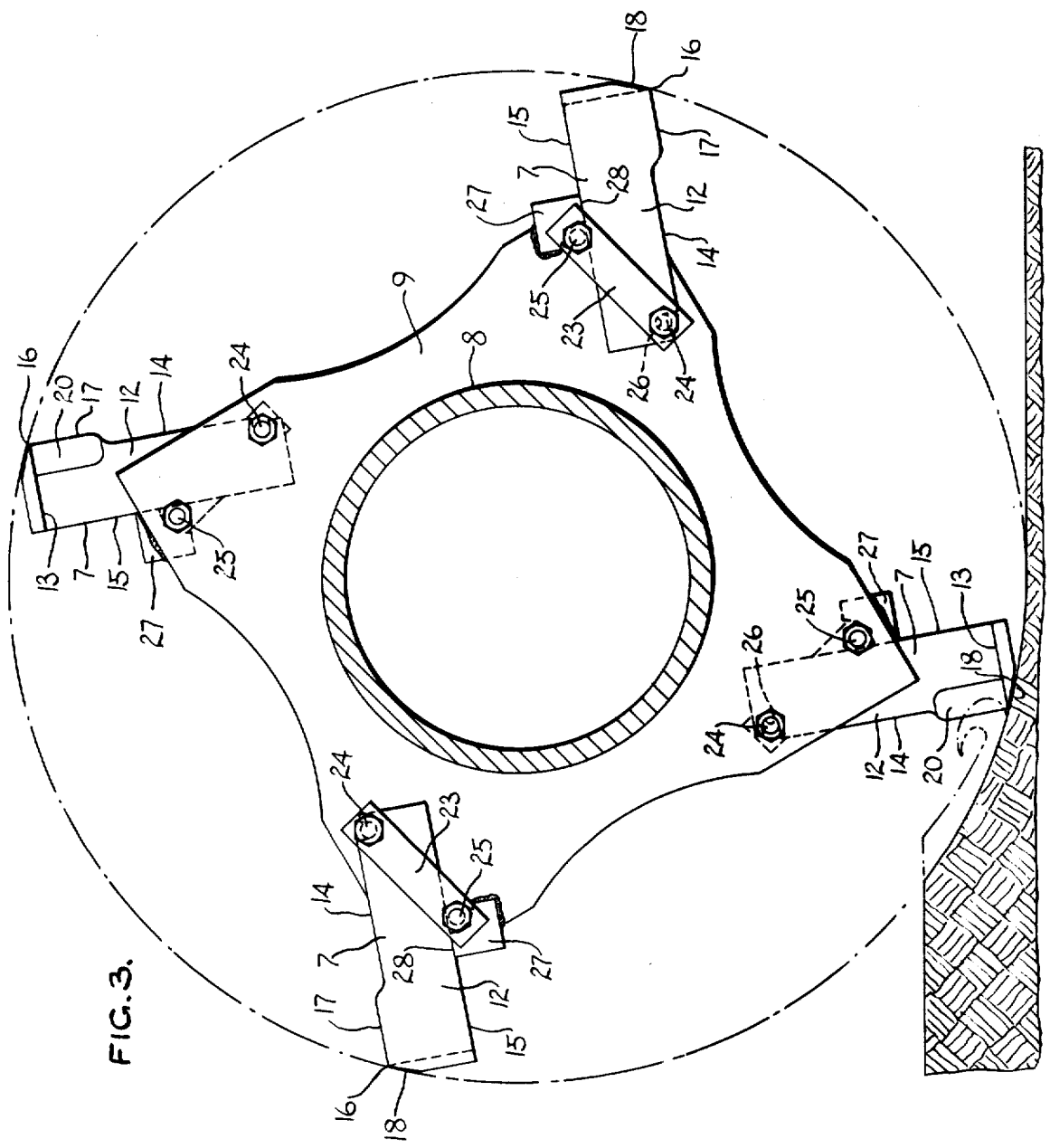
FIG. 3 is a plan view of one of the tine carriers of the rotor of this invention and the tines carried thereby.
Figure 5:
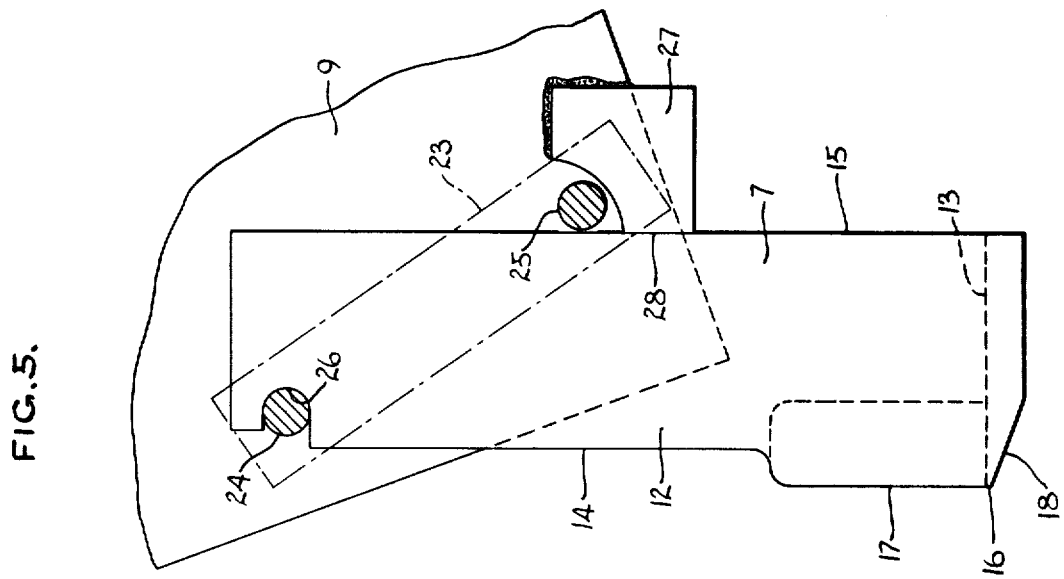
FIG. 5 is a side view of a tine of opposite hand from the one shown in FIG. 4 and its attachment to the carrier.
Figure 4:
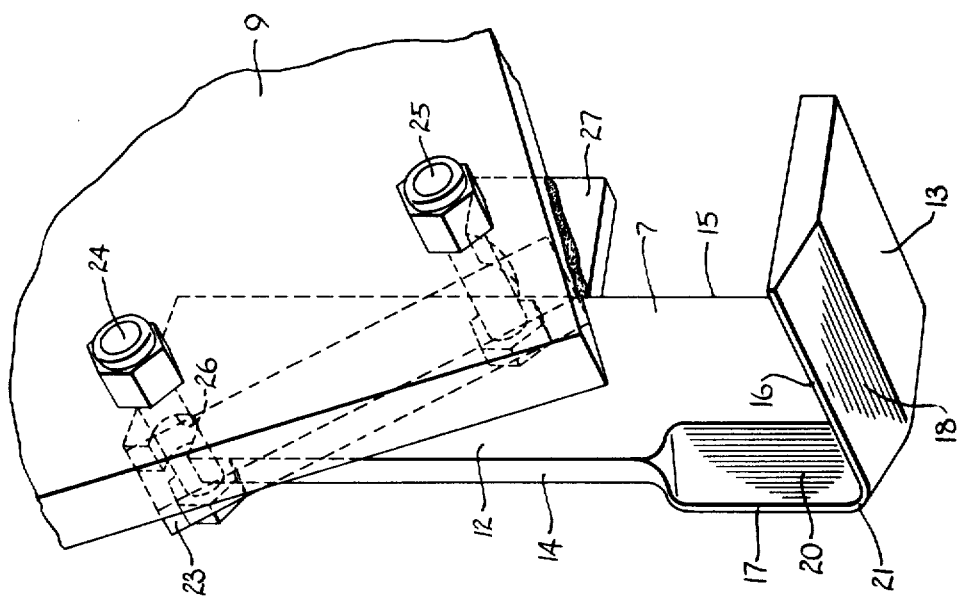
FIG. 4 is a perspective view showing one of the tines and the means attaching it to its carrier.
Figure 7:
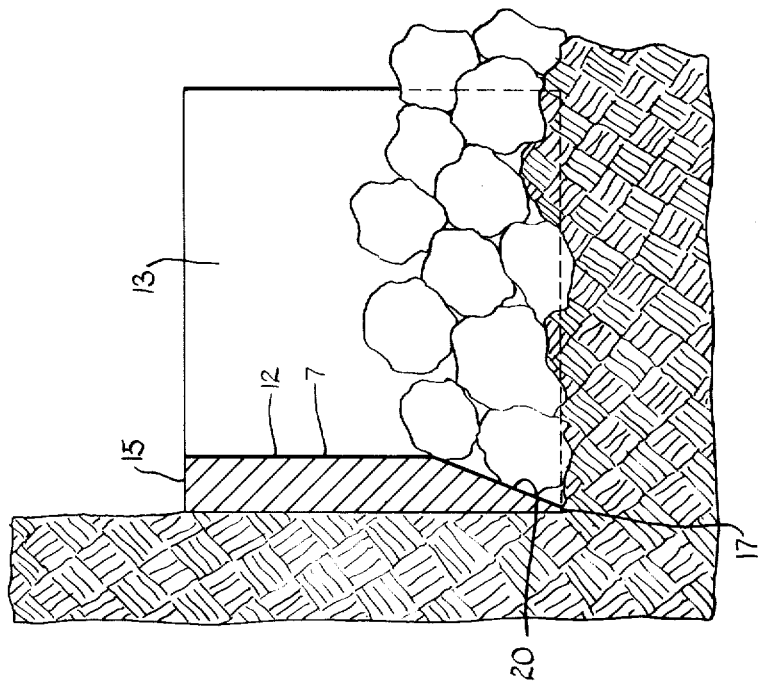
FIG. 7 is a diagrammatic horizontal sectional view through the shank of the tine and illustrating its cutting action.
Figure 6:
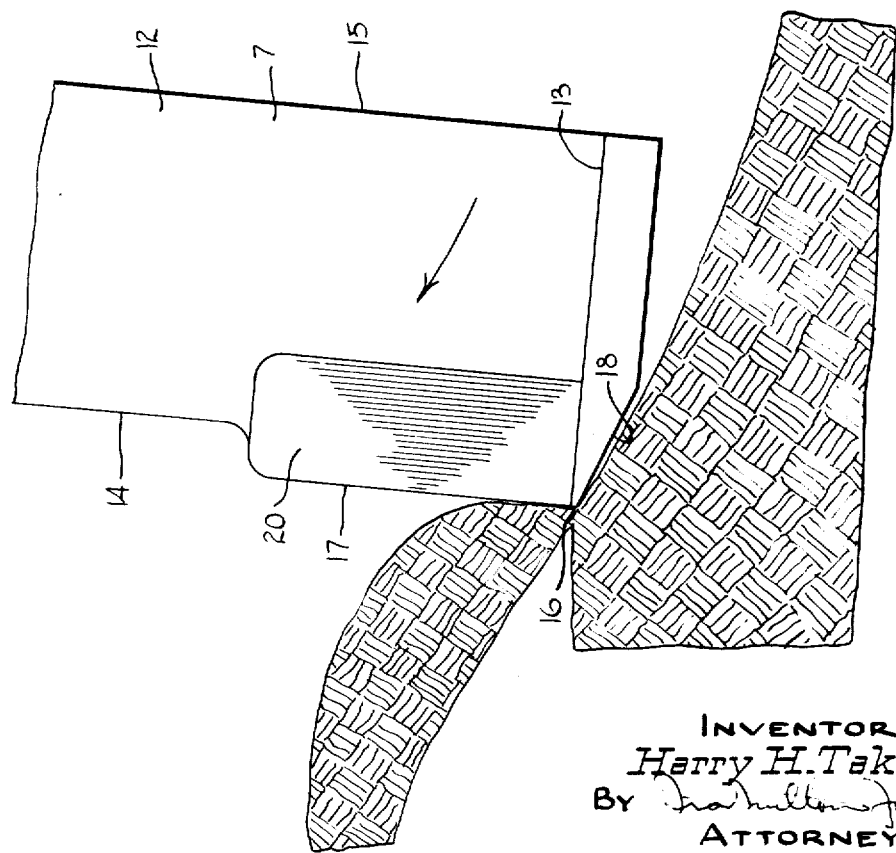
FIG. 6 is a fragmentary diagrammatic side view of one of the tines showing the cutting action of its hoe portion.

It is a feature of this invention that the sharp leading edge 16 on the hoe portion of the tine is defined by a bevel 18 on that side of the hoe portion which is remote from the shank. By reason of this location of the bevel 18 — as best seen in FIG. 3 — and the negative rake placement of the tine on its carrier with respect to the rotor axis, the surface of the bevel very nearly forms a chord to the circular orbit of the sharp leading edge 16, which is to say that the bevel surface has almost exclusively sliding engagement with the uncut ground beneath it. The hoe portion therefore tends to be worn parallel to its bevel surface, so that it is self-sharpening and does not substantially change its cutting depth as it wears.

Moreover, as also seen in FIG. 3, by virtue of the negative rake angle of the tine placement no part of the hoe portion extends radially beyond the circular orbit of the cutting edge 16. Instead, the entire hoe portion is inclined radially inwardly and rearwardly from that circular orbit. This provides so-called heel relief which keeps the hoe portion that trails its cutting edge out of contact with the uncut ground therebeneath. Because of this orientation of the hoe portion, its upper or radially inner surface exerts a substantial lifting effect upon the cut chip of ground above it, but such lifting action is desirable in the functioning of the rotor and does not consume an undue amount of power because the lifting action is exerted upon a loosened and relatively small volume of ground.

The sharp leading edge 17 on the shank is defined by a bevel 20 on that surface of the shank that faces the hoe portion. As the bevel on the shank moves through the ground, the bevel receives a wedging or camming reaction force from the ground that tends to urge the shank flatwise sidewardly. In some prior tines in which the bevel has been on the face of the shank opposite the hoe portion, as in the Riddle patent mentioned above, this reaction force was exerted by solid, uncut ground and was therefore a very large one, so that a substantial amount of power was needed to overcome it. With the present invention, however, this flatwise reaction force upon the shank is exerted by ground which has been loosened by the cutting action of the tine shank, and such ground offers far less resistance to motion of the shank therethrough than does solid uncut soil.

Each of the bevels 18 and 20 continues partway into the bend that connects the two arms of the tine so that the sharp leading edges of the shank and the hoe portion merge with each other to provide a cutting edge 21 at the corner formed by the junction of the shank and hoe portions.

To obtain a uniform cutting action from the rotor as a whole, the tines attached to each carrier 9 alternate around the carrier with respect to the axial direction in which their hoe portions project. This means that there are right and left-hand tines, and to achieve the desired balance there is an even number of tines on each carrier, half of them left-hand tines and the other half right-hand tines.

Moreover, the hoe portion of each tine extends across the plane of its carrier, so that the several tines on each carrier work on slightly overlapping strips of ground, and adjacent tine carriers are spaced apart by distances such that the cuts made by the hoe portions of their respective tines likewise slightly overlap; and to assure balanced cutting action along the length of the rotor, the angular displacement of the tine carriers and the resulting spiral arrangement of the tines at opposite sides of the lengthwise center of the rotor are mirror images of one another.

The shank of each tine flatwise overlies one surface of the tine carrier and is held in place thereon between a pair of abutments on the carrier that engage the leading and trailing edges of the shank by a clamping bar 23 that extends diagonally across the shank is and drawn tightly thereagainst by bolts 24 and 25. One of the abutments between which the shank is received — namely, the one that engages its leading edge, is provided by the bolt 24, and for a purpose to be described, the leading edge of the shank has a notch 26 to receive this bolt. While the bolt 25 could provide the other abutment, the one that engages the trailing edge of the shank, because of the greater load imposed thereon as the tine is forced through the ground, this abutment is provided by a block or plate 27 that is flatwise welded to the tine carrier adjacent to the hole through which the bolt 25 passes.

Since the purpose of the abutment block 27 is to relieve the bolt 25 of lateral loads, the edge surface 28 on the abutment block opposing the flat trailing edge surface on the shank, is so placed with respect to the bolt hole that the block holds the shank of the tine out of contact with the bolt.

It will be apparent that the reaction force imposed upon the tine by the ground that it is working tends to swing the tine about its engagement with the abutment block 27 and also about its engagement with the bolt 24, which is to say that the two abutments cooperate to prevent edgewise displacement of the shank. At the same time, the abutment provided by the bolt 24 cooperates with the notch 26 to prevent lengthwise displacement of the shank, and of course the clamping bar holds the shank against flatwise displacement.

The clamping bar 23 is a rigid, elongated flat member that overlies the shank in a band connecting the zones of its engagement with the abutments provided by the bolt 24 and the block 27. It has a pair of holes, one near each of its opposite ends, through which the bolts pass.

As noted hereinbefore, each tine is so placed on its carrier that its hoe portion extends across the plane of the carrier. Accordingly, the load imposed upon the hoe portion by the reaction forces acting thereon during operation impart a twisting stress to the shank which tends to lift the trailing edge portion of the shank off of the carrier. It is important, therefore, that nothing interfere with the security of the clamping effect provided by the bolt 25 and the adjacent end of the clamping bar 23 by which the trailing edge portion of the shank is held against the carrier. For this reason, the abutment block 27 which lies under the adjacent end portion of the clamping bar 23 — though preferably as thick as the shank — must not be thicker.

Tightening the bolts 24 and 25 thus firmly holds the shank in flatwise engagement with the tine carrier and precludes any possibility of the shank swinging away from the bolt 24, which — if permitted — would result in disengagement of its notch 26 from the bolt 24.

It will be apparent that removal of a tine can be effected by simply loosening the bolts 24 and 25, swinging the tine about the abutment 27 to disengage its notch 26 from the bolt 24 and then drawing the tine lengthwise out from under the clamping bar. Installation of a tine requires merely the reverse of this procedure.

From the foregoing description taken with the accompanying drawings, it will be apparent that this invention provides an improved rotor for an earth working machine, capable of performing its function with a very low power input and having tines which are capable of a long useful life and which do not change their cutting depth as they wear; and that the rotor of the present invention further minimizes down time on a machine upon which it is installed by reason of its providing for very quick and easy replacement of tines, without requiring that any part be detached from the rotor other than the tines to be replaced.

Those skilled in the art will appreciate that the invention can be embodied in forms other than as herein disclosed for purposes of illustration.

The invention is defined by the following claims:

I claim:

1. A tine for an earth working rotor, of the type that is L-shaped and has an elongated shank portion with opposite flat side surfaces and a hoe portion that projects to one side of the shank portion and has opposite surfaces substantially normal to said surfaces of the shank portion and a sharp leading edge, said tine being characterized by:
   A. the sharp leading edge of the hoe portion being provided by a bevel at the side surface thereof that is remote from the shank portion; and
   B. the shank portion having a bevel thereon at its side surface that faces the hoe portion, the last mentioned bevel extending a distance along the shank portion from the leading edge of the hoe portion and defining a sharp leading edge on the shank portion.

2. A tine for an earth working rotor in the form of a flat bar bent into an L-shape, with long and short arms, the long arm being securable to a rotor by which the tine is carried in one direction about the rotor axis with the long arm moving in a plane normal to the rotor axis and the short arm moving in a circular orbit concentric to the rotor axis,
   said tine being beveled along the entire leading portion of the short arm and along that part of the leading portion of the long arm that is adjacent to the short arm, to provide cutting edges,
   said tine being characterized by:
   A. the bevel on the short arm being at the face thereof which is radially outermost as the tine rotates about the rotor axis, so that wear at the cutting edge on the short arm does not affect the radius of the circular orbit defined by said edge; and
   B. the bevel on the adjacent part of the long arm being at the face thereof which is nearest the short arm, so that during operation with the tine acting upon fresh uncut soil the bevel on the long arm engages the loose soil resulting from the cutting action of the tine, thus minimizing the side thrust imposed on the tine by the reaction against the soil of said bevel on the long arm.

3. The tine of claim 2, further characterized in that the adjacent portions of the cutting edges on the long and short arms are curved to merge with one another around the bend which connects the arms.

4. An earth working rotor comprising:

A. a shaft member having axially spaced tine carrier plates each of which has opposite flat parallel sides normal to the rotor axis;

B. an even number of tines for each carrier plate, each tine being L-shaped and having a long shank with opposite flat parallel sides and a short hoe portion projecting perpendicularly from one side of the shank;

C. attaching means securing the tines to their respective carrier plates with the sides of the shanks of the tines from which their hoe portions project flat against one side of the carrier plate and the hoe portions projecting across the plane of the carrier plate, and equispaced from the rotor axis and outwardly of the periphery of the carrier plate, half of the tines on each carrier plate being at one side of the carrier plate and the other half thereof being at the other side of the carrier plate;

D. a sharp leading edge on the hoe portion and on the shank of every tine, said sharp leading edges of the hoe portions being formed by a bevel at the side of the hoe portion that is remote from its shank and hence radially outermost with respect to the rotor axis, and said sharp leading edges of the shanks being formed by a bevel at the side of the shank which faces the hoe portion and which is flat against the carrier plate; and E. the carrier plates being spaced from one another along the axis of the rotor a distance such that the cuts made by the hoe portions of their respective tines slightly overlap.

5. The earth working machine rotor of claim 4, further characterized in that the sharp leading edges of the shank and hoe portions of each tine merge with one another in a curve which extends around the junction of the shank and hoe portions.

6. The earth working machine rotor of claim 4, wherein each tine is so disposed on its carrier plate that no part of its hoe portion extends farther from the rotor axis than does the sharp leading edge of the hoe portion.

7. The earth working machine rotor of claim 6, wherein the disposition of each tine on its carrier plate is such that the bevel which forms the sharp leading edge of the hoe portion very nearly forms a chord to the circle traced by the sharp leading edge of the hoe portion as it travels around its orbit.

* * * * *